J. B. Root,
Piston-Packing Ring.
Nº 57,189. Patented Aug. 14, 1866.

Witnesses:
J. W. Coombs
A. Sellers

Inventor:
John B. Root

UNITED STATES PATENT OFFICE.

JOHN B. ROOT, OF NEW YORK, N. Y.

IMPROVEMENT IN PISTON-PACKING RINGS.

Specification forming part of Letters Patent No. 57,189, dated August 14, 1866; antedated August 8, 1866.

*To all whom it may concern:*

Be it known that I, JOHN B. ROOT, of the city, county, and State of New York, have invented a new and useful Improvement in Piston-Packings; and I do hereby declare that the following is a full, clear, and exact description of the same, reference being had to the accompanying drawings, forming part of this specification, in which—

Figure 2:
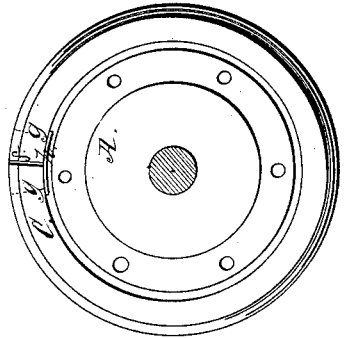
Figure 1:
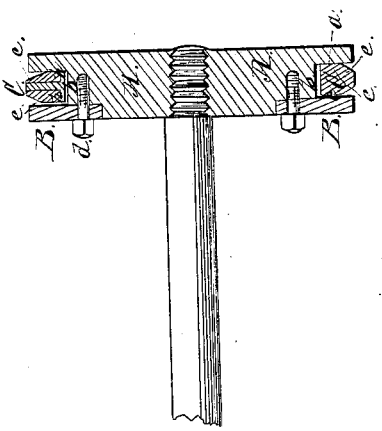

Figure 1 is an axial section of a piston with my packing applied. Fig. 2 is a view in a plane perpendicular to the axis, with the cap-plate removed to expose the packing.

Similar letters of reference indicate corresponding parts in both figures.

This invention relates to metallic packing-rings which are kept tight by the pressure of the steam or other fluid by which the piston is driven or which it is employed to move; and it consists in a novel construction of such rings, whereby a tight fit, both to the cylinder and to the body of the piston, is insured.

To enable others skilled in the art to make and use my invention, I will proceed to describe its construction and operation.

A is the body of the piston, in the periphery of which is a circumferential rabbet, $a\ b$, and to which there is secured, by screw-bolts $d\ d$, an annular plate, B, so arranged as to form in connection with the aforesaid rabbet a square groove, $a\ b\ c$, as shown in Fig. 1, for the reception of the packing-ring C. This packing-ring has its transverse section of the form of a parallelogram with its outer angles beveled off, as shown at $e\ e$ in Fig. 1. Its internal circumference is somewhat larger than the circumference of the bottom $b$ of the groove $a\ b\ c$, its external circumference such that in its normal condition it will pass loosely or freely within the cylinder, and its thickness, in a direction parallel with its axis, somewhat less than the width of the groove $a\ b\ c$, that the steam or other fluid in the cylinder may pass freely between it and one side of the groove to the interior of the ring.

On opposite sides of the division $f$ of the said ring, by which its circumferential expansion is provided for, the said ring is mortised through in a plane perpendicular to its axis, for the reception of the flat portion $g$ of the thin joint-piece $g\ h$, which is of T shape in its transverse section, and which is fitted steam or water tight into the said mortise. The portion $h$ of the said joint-piece is curved longitudinally and fitted steam or water tight to the interior of the ring.

In the operation of the piston the steam or other fluid in the cylinder passes between the cylinder and the exterior peripherical surface of the body A or plate B of the piston, and so comes into operation on one or the other side of the packing-ring, according as the pressure is on one or the other side of the piston, and presses the said ring against the other side, $a$ or $c$, of the groove $a\ b\ c$ in such manner as to form a tight joint, through which the steam or other fluid cannot pass between the ring and that side of the groove, while a sufficient space is left between the ring and the opposite side of the groove for the steam or other fluid to pass to the interior of the ring and to press the ring outward against the cylinder, and thus prevent leakage between the piston and cylinder. This action of the steam or other fluid, by which the packing-ring is kept tight both with the piston and cylinder, is rendered much more certain and effective by the bevels $e\ e$ on the packing-ring, as the triangular space formed by the bevel on the opposite side of the ring to that on which the pressure comes is brought into communication with the atmosphere, or with that end of the cylinder at which there is a reduced pressure; and hence that side of the ring is, in proportion to the area of the surface-bevel, relieved of pressure both circumferentially and in the direction of the length of the cylinder; and by varying the angles of the bevels the pressure may be made to act upon the rings more or less in an outward or forward direction.

The pressure of the steam or other fluid admitted to the interior of the packing-ring acts upon the back of the portion $h$ of the T-shaped joint $g\ h$, and so presses it out tightly against the interior of the ring and prevents leakage through the joint $f$.

The two parts $g$ and $h$ of the joint $g\ h$ may be made of one piece or of two separate pieces, and in the latter case the curved part, $h$, will be attached to the ring on one side of the joint $f$, and lap over it on the opposite side of the said joint.

In a large piston the plate B may be dispensed with and the groove $a\ b\ c$ be made on the solid body of the piston and have the packing-ring C sprung into it; but in pistons of smaller size the removable plate B is necessary to admit the ring to its place.

I do not claim, broadly, a piston-packing ring so applied in a groove in the body of the piston that the steam or other fluid in the cylinder may enter the said groove from the outside of the piston; but

What I claim as my invention, and desire to secure by Letters Patent, is—

A packing-ring beveled at its outer edges, as shown at $e\ e$, and herein described, and fitted to the piston and cylinder, to operate as herein set forth.

JOHN B. ROOT.

Witnesses:
 HENRY T. BROWN,
 J. W. COOMBS.